US009141989B2

(12) United States Patent
Bitz et al.

(10) Patent No.: US 9,141,989 B2
(45) Date of Patent: Sep. 22, 2015

(54) SYSTEMS AND METHODS FOR USING A SOCIAL NETWORK TO PROVIDE PRODUCT RELATED INFORMATION

(75) Inventors: Pavel Bitz, Tel Aviv (IL); Liad Agmon, Chicago, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 1184 days.

(21) Appl. No.: 12/645,639

(22) Filed: Dec. 23, 2009

(65) Prior Publication Data
US 2011/0153451 A1 Jun. 23, 2011

(51) Int. Cl.
G06Q 30/06 (2012.01)
G06Q 30/02 (2012.01)

(52) U.S. Cl.
CPC ........ G06Q 30/0641 (2013.01); G06Q 30/0601 (2013.01); G06Q 30/0623 (2013.01); G06Q 30/0631 (2013.01); G06Q 30/02 (2013.01)

(58) Field of Classification Search
CPC .................................. G06Q 30/0601–30/0645
USPC .................................... 705/26, 27, 26.1–27.2
See application file for complete search history.

(56) References Cited

U.S. PATENT DOCUMENTS

2009/0187537 A1 7/2009 Yachin et al.
2010/0030578 A1* 2/2010 Siddique et al. ................ 705/3

FOREIGN PATENT DOCUMENTS

CA 2659698 A1 9/2009

OTHER PUBLICATIONS

Lancaster, F. W., & Neway, J. M. (1982). The future of indexing and abstracting services. Journal of the American Society for Information Science (Pre-1986), 33(3), 183. Retrieved from http://search.proquest.com/docview/216638699?accountid=14753.*
Canadian Intellectual Property Office, Office action in Application No. 2,714,783, dated Dec. 3, 2012.
Canadian Intellectual Property Office, Office action in Application No. 2,714,783, dated Apr. 15, 2014. (4 pages).

* cited by examiner

Primary Examiner — Resha Desai
(74) Attorney, Agent, or Firm — McAndrews, Held & Malloy, Ltd.

(57) ABSTRACT

Social product related content, such as user reviews, comments, and catalogs, are presented to a user via an e-commerce website by assembling, in response to the user requesting accesses to a webpage of the e-commerce website having information for a product, such as a product detail page, a set of documents that have been cross-referenced to the product and by extracting from the set of documents a subset of documents that have been cross-referenced to individuals within a related persons map of the user. The requested webpage is then presented to the user in a manner that additionally provides the user with access to the subset of documents.

11 Claims, 13 Drawing Sheets

Reviews

My Network | Everyone

— 210

"Great entry level camera" 05/04/2009
By Yogash Babbar "yogi" ★★ who rated ★★★★☆

I moved to my first DSLR from a Canon S5 IS. Great machine. Feels just about right in terms of weight, size and handling. I do miss the variety of functions the S5 had but I guess that comes at a price for better image quality, interchangeability of lenses and versatility of shooting...
Read full review>

15 commentes. 30 of 40 found this review helpful.

"Great entry level camera" 05/04/2009
By Yogash Babbar "yogi" ★★ who rated ★★★★☆

I moved to my first DSLR from a Canon S5 IS. Great machine. Feels just about right in terms of weight, size and handling. I do miss the variety of functions the S5 had but I guess that comes at a price for better image quality, interchangeability of lenses and versatility of shooting...
Read full review>

15 commentes. 30 of 40 found this review helpful.

Read All Reviews (50)

— 218  Add a review

Related Users

My Network | Everyone — 214

Yogash Babbar "yogi"
commented this product

BEN
Rated this product ★★★★☆

Yogash Babbar "yogi"
Added to catalog "Things I will buy on 2009"

Catalogues Containing This Product

My Network | Everyone

"My first catalofue on this site" by Marshall Goldberg
(66 items)

"Fashion" by Marshall Goldberg the 1st
(12 items)

"BAGS" by Sibyl Hanson
(12 items)

— 216

Comments (10)

My Network | Everyone

B. Hinchey says on 02/04/2009, 11:34 AM:
I am seriously thinking of buying this camera. What lens would you recommend I buy

FIG. 4

Order Summary

**Craftsman LTS 1500 17.5 HP/42"
Lawn Tractor**

Qty. 1

Item Total:              $974.99

Subtotal:                $974.99
Sales Tax:                $60.94
Delivery:                 $65.00

Order Total:         $1100.93

Total Savings:            $25.00

Additional discounts may apply.

Continue Checkout                    702

☑ Add to Delver catalogue ⎯⎯⎯⎯

VeriSign Secured
VERIFY ▶

ABOUT SSL CERTIFICATES

SYSTEMS AND METHODS FOR USING A SOCIAL NETWORK TO PROVIDE PRODUCT RELATED INFORMATION

BACKGROUND

The subject invention generally relates to computer-based retail services and, more particularly, relates to systems and method for using a social network to provide product related information.

In the art, systems and methods are generally known for presenting a user with information related to a product and/or service (hereinafter individually and collectively referred to as "product"). For example, U.S. Pat. No. 7,072,884 describes that many retailers have their own e-commerce website to advertise, market, and sell their products. To assist the user in purchasing a product, the websites typically provide to a user information that is directly related to the product such as the product's brand, size, color, price, availability, and/or other product specifications. Due to a plethora of information, websites may include a search engine for the user to easily navigate to and locate a particular product and/or product information they desire.

As a further mechanism to assist a user in the purchase of a product, U.S. Pat. No. 7,478,054 describes a system that functions to notify a first user about a purchase made by a second user. To this end, the system functions to detect that the second user has purchased an item and to determine that the first user has a purchase notification relationship with the second user. The system then provides to the first user a notification, such as an email, that the second user has purchased the item.

Yet further, U.S. Pat. No. 6,092,049 describes a system that functions to actively recommend products to a user. For this purpose, the system utilizes collaborative filtering techniques to associate products with users having a particular user profile considering ratings given to products by users or inferred for users by the system. More particularly, profiles of users and product ratings are used to determine similarity factors with respect to users whereby a user within a determined set of similar users is recommended products that have been highly rated by other users within the set of similar users.

For still further directing a user to a product purchasing opportunity, U.S. Publication No. 2009/0187537 describes a system that assembles a set of documents for a user in response to a search query by the user considering a social network of the user. A respective person is identified with each of a group of documents in the set. For at least one document in the group, a chain of one or more links is found in the social network between the respective person and the user. In this manner, in response to a search request, a search results webpage is displayed which includes an identification of the at least one document together with a sequence of breadcrumbs corresponding to the one or more links in the social network chain between the user and the respective person.

While the systems and methods described in these exemplary publications, which are incorporated herein by reference in their entirety, generally work for their intended purpose, the subject invention provides improvements thereto which improvements will become apparent from the descriptions that follow.

SUMMARY OF THE INVENTION

The following describes systems and methods for using a social network to provide product related information to a user, preferably in connection with a product details webpage provided via an e-commerce website of a retailer.

While the forgoing provides a general overview of some of the various features and functionalities of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 4 illustrates a close-up view of a portion of the exemplary product details webpage of FIG. 2;

FIG. 9 illustrates an exemplary user catalog webpage;

FIG. 11 illustrates a close-up view of a further portion of the exemplary user catalog webpage of FIG. 10;

FIG. 13 illustrates a webpage including created polls.

DETAILED DESCRIPTION

Figure 1:
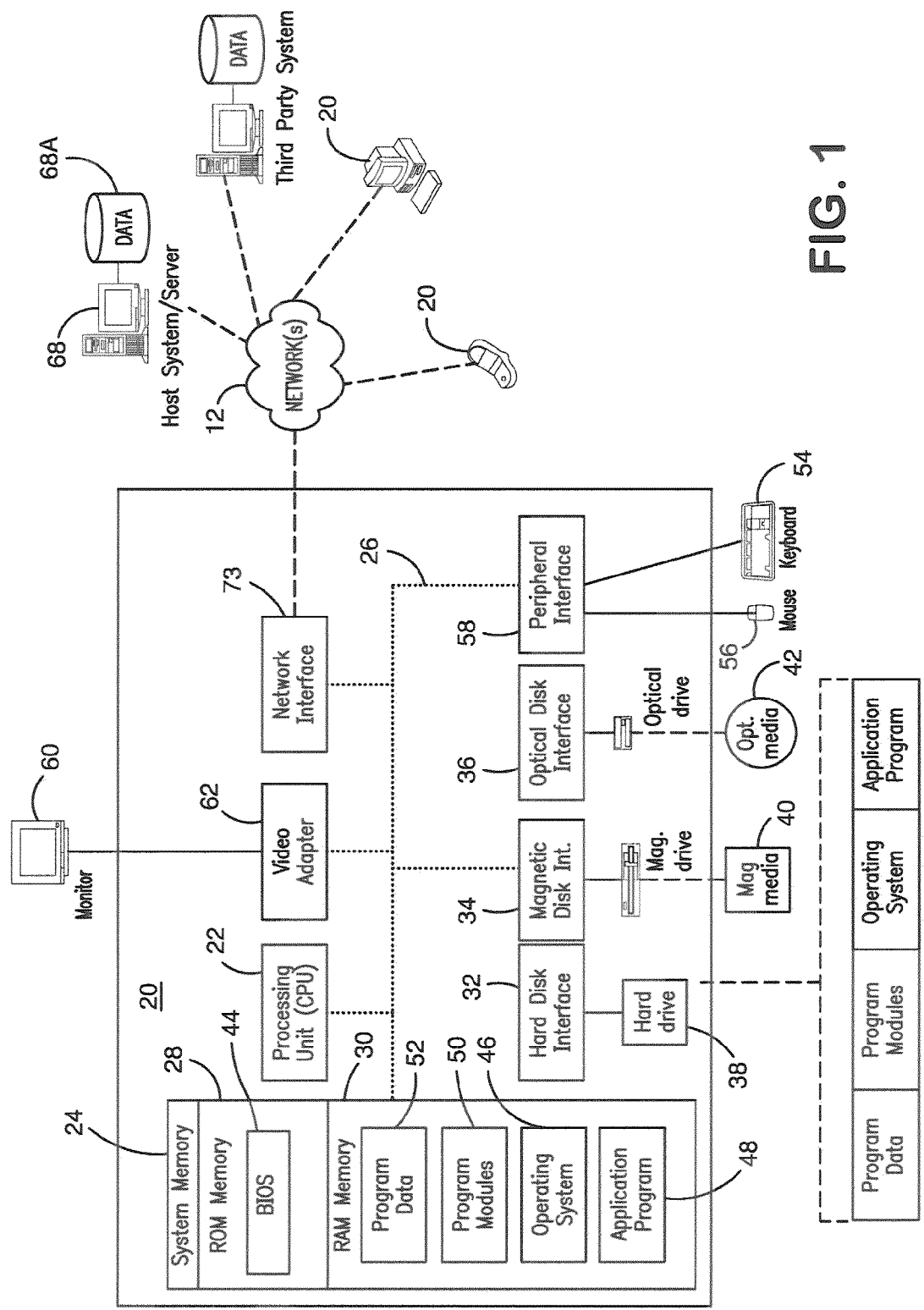
FIG. 1 illustrates in block diagram form components of an exemplary, online, retail, computer network environment.

With reference to the figures, the following describes various systems and methods for using a social network to provide product related information to a user. In this regard, the product related information may include comments/reviews about the product and/or related products provided by others within the social network of the user, catalogs created by others within the social network of the user which include the product and/or related products, and/or the like. To this end, with reference to FIG. 1, a processing device 20, illustrated in the exemplary form of a computer system, is provided with executable instructions to, for example, provide a means for a user, e.g., a consumer, to access a host system server 68 and, among other things, view content, share content, search for products, order products, schedule and/or manage delivery of ordered products, schedule and/or manage pick-up of ordered products, and the like. Generally, the computer executable instructions reside in program modules which may include routines, programs, objects, components, data structures, etc.

that perform particular tasks or implement particular abstract data types. Accordingly, those skilled in the art will appreciate that the processing device 20 may be embodied in any type of device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network, such as the Internet, whereby the executable instructions may be associated with and/or executed by one or more of the multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via the network 12 and, via such connections, will be associated with data repositories that are associated with such other third party systems. Such third party systems may include, without limitation, systems of banking, credit, or other financial institutions, systems of third party providers of goods and/or services, systems of shipping/delivery companies, systems that support social networking, etc.

For performing tasks as needed, the host system server 68 may include many or all of the elements described above relative to the processing device 20. In addition, the host system server 68 would generally include executable instructions for, among other things, making socially relevant product related content available to users, allowing product related content to be shared amongst users in the social network environment, making products available for purchase, handling search requests, providing search results, accessing pricing information related to products, accessing inventory and product availability data, providing a means for the user to schedule and/or manage orders for delivery and facilitating any such delivery of ordered products, providing a means for a user to schedule and/or manage orders for pickup and facilitating any such pickup of ordered product, and the like.

Communications between the processing device 20 and the host system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) associated with the host system server 68.

As noted above, the subject invention uses links in a user's social network to provide product related information to a user where the product related information may include, without limitation, comments/reviews about a particular product and/or related products provided by others within the social network of the user, catalogs created by others within the social network of the user which include a particular product and/or related products, and/or the like. In the context of the patent application, the term "social network" is used broadly to mean not only networks of explicit links between people but also to include implicit links inferred from characteristics such as common membership in a social grouping. As a system and method for determining such social networking connections or links between people to thereby provide a user with access to socially relevant content is generally described in incorporated U.S. Published Application No. 2009/0187537, the same will not be described herein for the sake of brevity.

Figure 2:
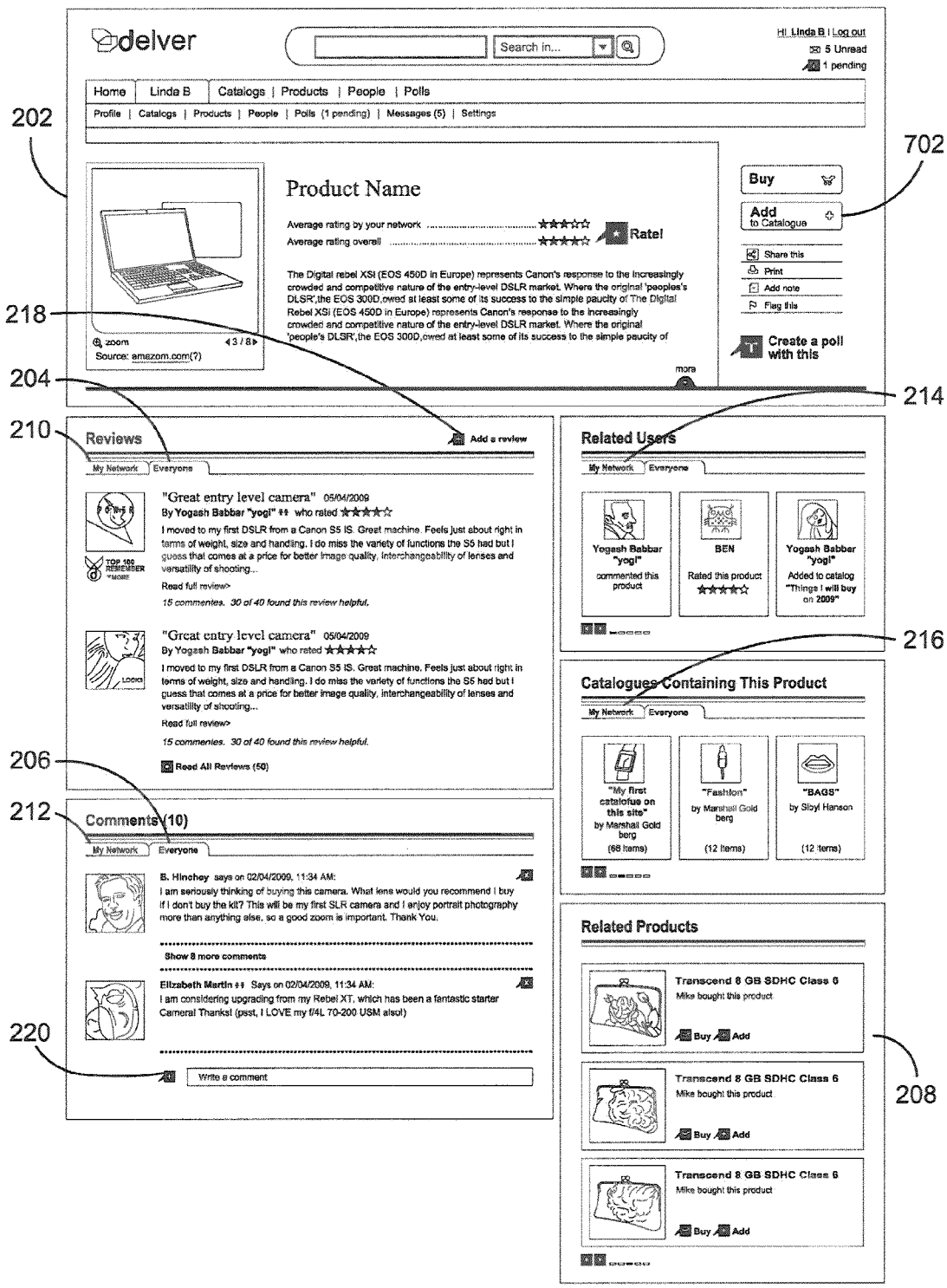
FIG. 2 illustrates an exemplary product details webpage including social, product related information.
Figure 5:
FIG. 5 illustrates a close-up view of a further portion of the exemplary product details webpage of FIG. 2.

To gain access to product related information and, more particularly, product related information as provided by others within a social network of a user, it is contemplated that the user will use their computer 20 to access e-commerce related services provided via the host system server 68 and use such e-commerce related services to, for example, navigate to a detail webpage for a product of interest. When the user is recognized by the host system server 68, e.g., the user has provided log-in information to the host system server 68, a user identifier (such as stored in a cookie) has been retrieved from the user computer 20 by the host system server 68, etc., in addition to being presented with information 202 that is directly related to the product, such as the product's brand, size, color, price, availability, and/or other product specifications, generally provided reviews 204 and comments 206 about the product, and generally provided recommendations 208 of products related to the product, the user is presented with the opportunity to view reviews 210 for the product as provided by others within the social network of the user, to view comments 212 for the product as provided by others within the social network of the user, to view the profiles 214 of others within the social network of the user that have, in some way (such as via a review, comment, purchase, etc.), associated themselves with the product, and to view catalogs 216 of others within the social network of the user that include the product as is illustrated in FIGS. 2, 4, and 5. As will be described in greater detail hereinafter, a catalog is a user created aggregation of product information and/or the like.

Figure 3:
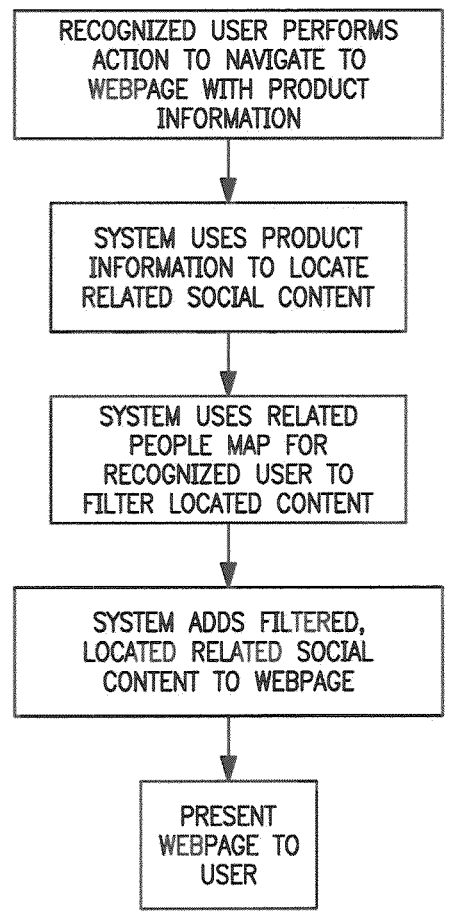
FIG. 3 illustrates a flow diagram illustrating an exemplary method for providing social, product related information to the exemplary product details webpage of FIG. 2.

By way of further example with reference to FIG. 3, when a system recognized user navigates to a detail webpage for a particular product, the system may use information associated with the product/product detail webpage, e.g., information in one or more tags associated with the product/product detail webpage, to locate documents, e.g., user reviews, user commentary, user created catalogs, etc., that are related to the product/product detail webpage, e.g., documents having the same or similar tags. Documents located in this manner would then be further filtered to extract from the located documents those documents that are associated with users that are within the social network of the recognized user, e.g., users that are within the Related People Map (RPM) for the recognized user. The located, filtered reviews, commentaries, catalogs, etc., links thereto, and/or excerpts therefrom may then be integrated into the product search results webpage as described above with reference to the exemplary product webpage shown in FIGS. 2, 4, and 5.

In a similar manner, when a system recognized user navigates to a detail webpage for a particular product, the system may use information associated with the product/product detail webpage, e.g., information in one or more tags associated with the product/product detail webpage, to locate user profiles, e.g., social networking webpage(s) of users, that are related to the product/product detail webpage, e.g., profiles that have the same or similar tags (for example, as indicated by a user purchasing the product, reviewing the product, commenting of the product, etc.). User profiles located in this manner would then be further filtered to extract from the located user profiles those user profiles that are associated with users that are within the social network of the recognized user, e.g., users that are within the RPM for the recognized user. The located, filtered user profiles, links thereto, and/or excerpts therefrom may then be integrated into the product search results webpage again as described above with reference to the exemplary product webpage shown in FIGS. 2, 4, and 5.

While the foregoing describes one method for obtaining and presenting social, product related information to a user within a product detail webpage of a retailer's e-commerce website, it is to be appreciated that this description is not intended to be limiting and that the order in which these steps are performed may be varied to still provide the same results. It is also to be appreciated that the above described type of social, product related information can be equally provided to a search result webpage or the like where, for each of multiple products presented to a user on such a webpage, the user is also presented with social, product related information for one or more of the multiple products.

Figure 6:
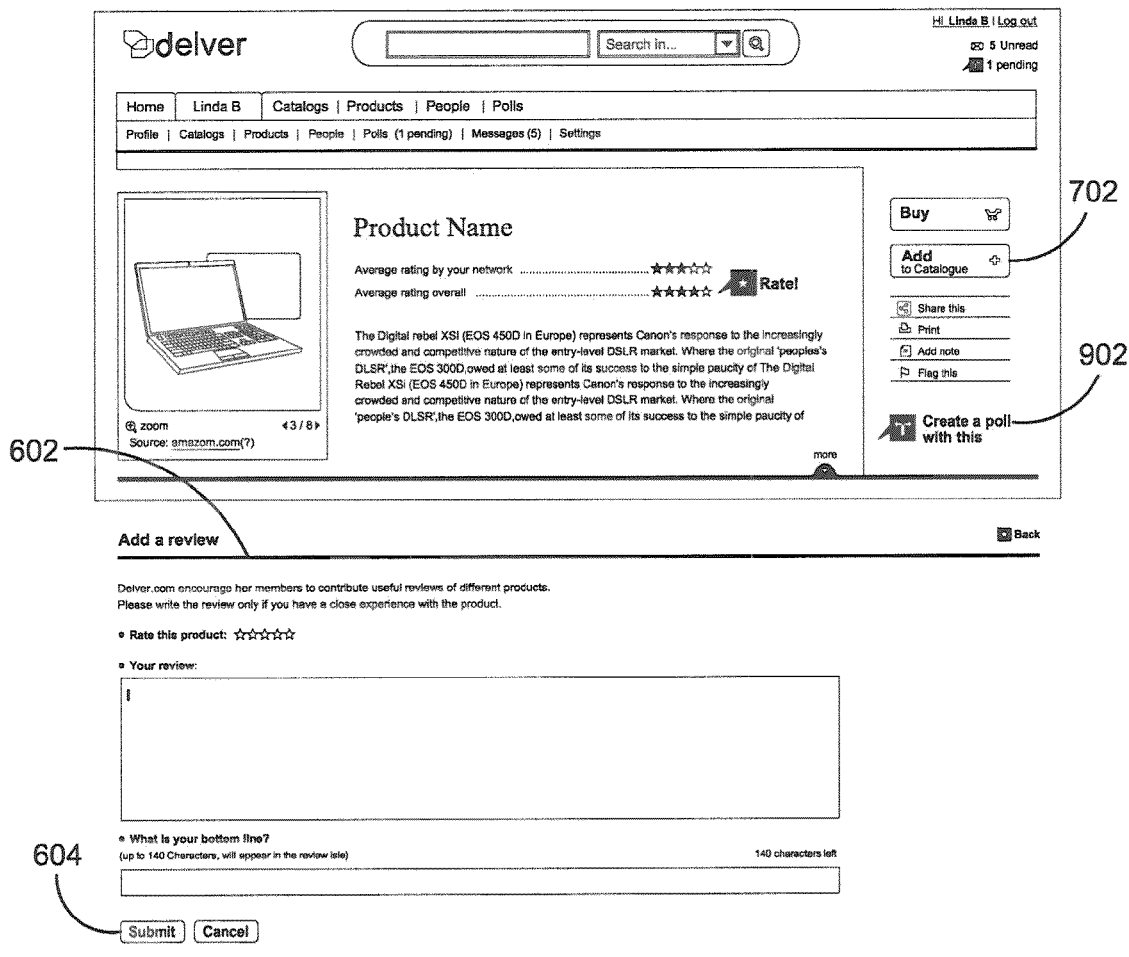
FIG. 6 illustrates an exemplary dialogue for providing social, product related information in the form of a product review.

To obtain from users social product related content, a webpage presented to a user, e.g., a product detail webpage, may additionally include links which, when activated by the user, can invoke tools whereby the user may provide to the system a user review 218 or a user comment 220 for a particular product, e.g., the product that is currently being presented within the product detail webpage. For example, when a user activates link 218 the user may be presented with a dialogue 602, such as illustrated in FIG. 6, whereby the user may provide the system with a review for a particular product. In this regard, the review may include, without limitation, a rating for a product, e.g., from 0-5 stars, and/or user provided commentary. Once a prepared review is submitted to the system, e.g., the user activates the "submit" link 604, the submitted document is stored in an associated database and will be cross-referenced to both the user and the relevant product whereby it can be later accessed for presentation to other users as described above. While the foregoing describes a user submitting a review for storage by the system, it will be appreciated that the same mechanisms would be used to save user supplied, product related comments.

Figure 9:
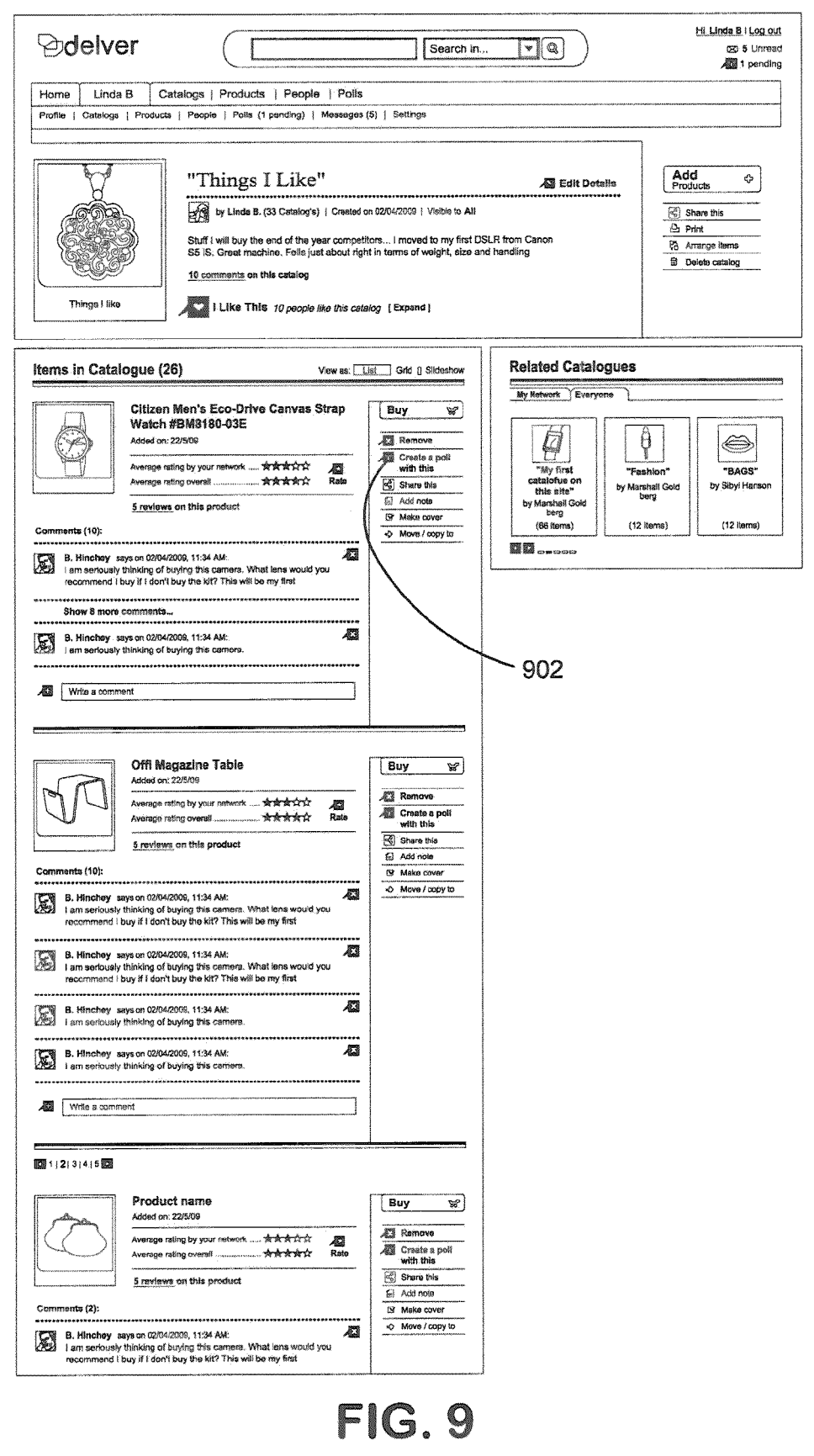
Figure 10:
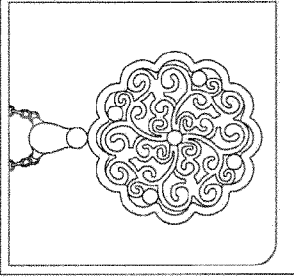
FIG. 10 illustrates a close-up view of a portion of the exemplary user catalog webpage of FIG. 10.
Figure 11:
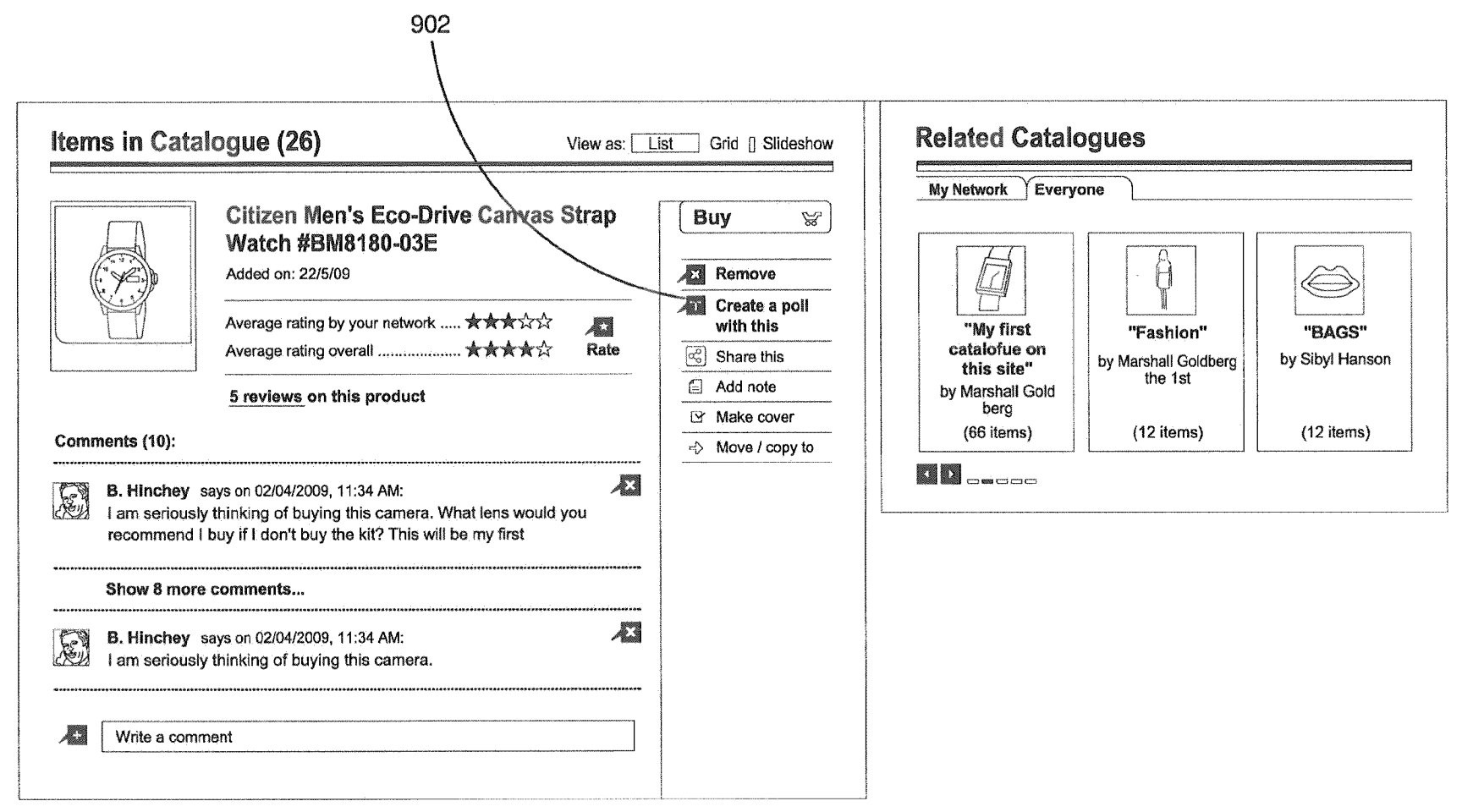
Figure 12:
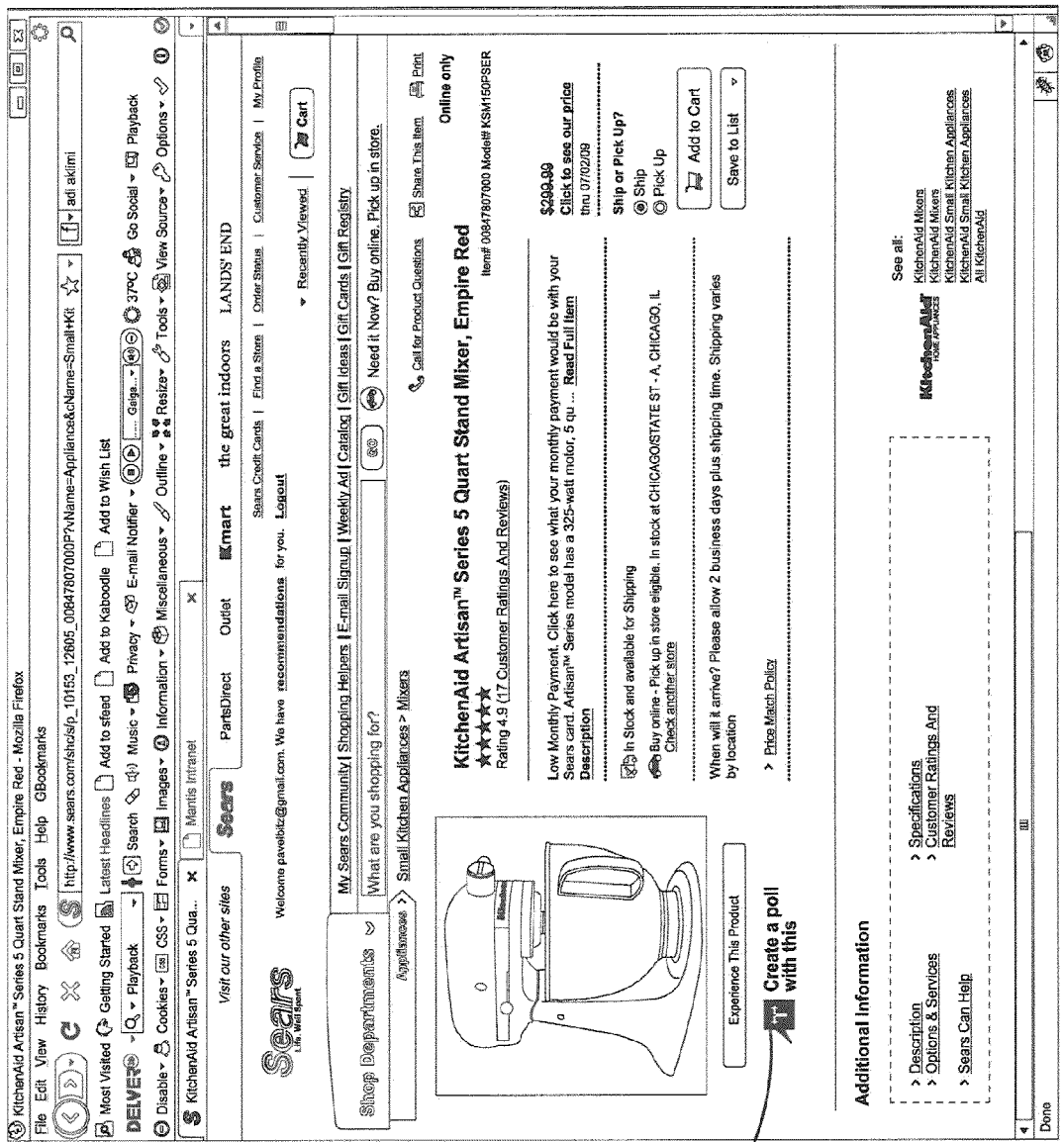
FIG. 12 illustrates a product detail webpage including a mechanism for creating a poll related to a product.
Figure 13:
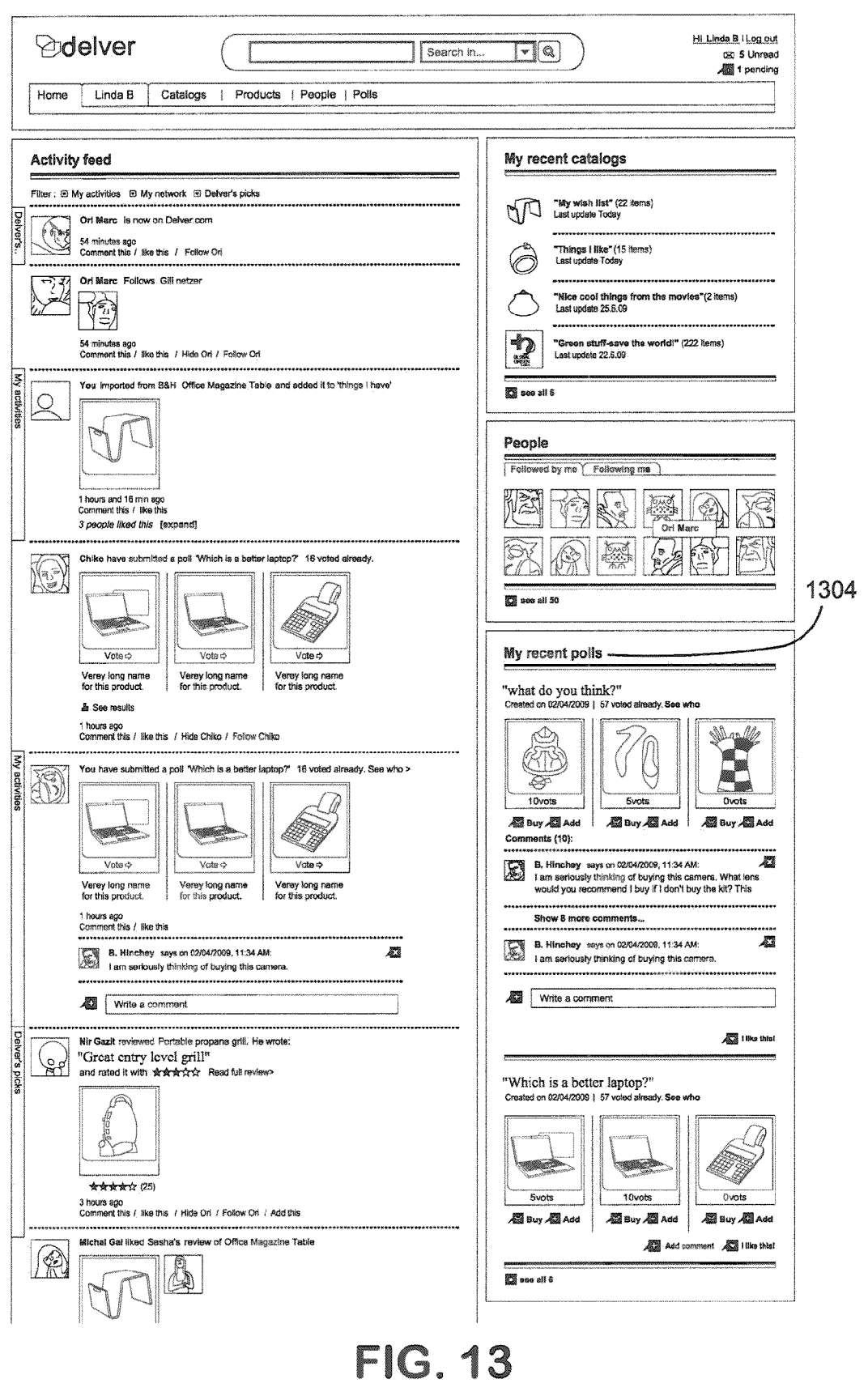

Considering now FIGS. 9, 10, and 11, a user catalog generally comprises a user created aggregation of product information and, as such, a stored user catalog would be cross-referenced to the user as well as to each product contained therein. As further illustrated in FIGS. 9, 10, and 11, a user catalog may also contain, without limitation, a title for and description of the catalog, comments, reviews, etc. which comments, review, etc. may be provided by the user and/or by others that have accessed the catalog of the user. Still further, a user catalog webpage may include one or more of the graphical user interface supported features described above to, for example, allow a user to navigate to other web webpages, to allow a user (or others) to provide reviews, comments, etc., for products within the catalog and/or the catalog itself, view related catalogs, remove or add content to the catalog, buy a product, share the catalog with others and the like. A product catalog may also provide a link 902 whereby a user can "create a poll" which poll would be shared with the social network of the user or other users more generally such as, for example, by being posted 1304 on a webpage as illustrated in FIG. 13. In this regard, a poll may be a request for others to provide a rating for a product, indicate whether the user should buy the product, and the like without limitation. As further shown in FIG. 12, a user can similarly request that a poll be created from a product detail webpage.

Figure 7:
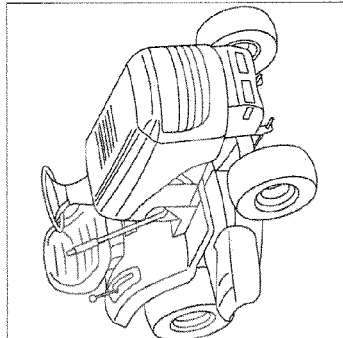
FIG. 7 illustrates a product detail webpage including an exemplary mechanism for adding product information to social, product related information in the form of a user catalog.
Figure 8:
FIG. 8 illustrates a product purchase webpage including an exemplary mechanism for adding product information to social, product related information in the form of a user catalog.

To allow a user to easily add product information to one or more of their catalogs, the system may additionally provide an "add to catalog" button 702 such as illustrated in FIGS. 7 and 8. In this regard, when a user activates the "add to catalog" button 702, the system will function to automatically add to an indicated catalog of the user information for the product that is associated with the "add to catalog" button 702 so activated. For example, if the user activates the "add to catalog" button 702 from a product detail webpage as shown in FIG. 7, information for the product that is shown in the product detail webpage will be automatically added to a catalog of the user. Similarly, if the user activates the "add to catalog" button 702 presented to the user during a checkout process/product purchasing process, e.g., the user is at a shopping cart webpage or a purchase summary webpage as illustrated in FIG. 8, information for the product that is being purchased will be automatically added to a catalog of the user.

While various concepts have been described in detail, it will be appreciated by those skilled in the art that various modifications and alternatives to those concepts could be developed in light of the overall teachings of the disclosure. For example, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A computer-readable media embodied in a non-transient, physical memory device having stored thereon computer-executable instructions for presenting social product related content to a user via an e-commerce website, the instructions performing steps comprising:
in response to the user requesting access to a webpage of the e-commerce website having information for a product:
assembling from a data repository in which is stored documents which have been cross-referenced to products and individuals a set of documents wherein the assembled set of documents includes only those documents that have been cross-referenced within the data repository to the product;
using a related persons map associated with the user to automatically retrieve from the assembled set of documents a subset of documents wherein the subset of documents includes only those documents within the assembled set of documents that have been cross-referenced within the data repository to individuals that are within the related persons map of the user; and
presenting to the user the webpage of the e-commerce website having information for the product wherein the webpage further provides the user with access to the subset of documents.

2. The computer-readable media as recited in claim 1, wherein the subset of documents includes at least one of a user provided review of the product, a user provided comment about the product, and a user created catalog including the product.

3. The computer-readable media as recited in claim 2, wherein the webpage includes a link to one or more documents within the subset of documents.

4. The computer-readable media as recited in claim 2, wherein the webpage includes an excerpt from one or more documents within the subset of documents.

5. The computer-readable media as recited in claim 1, wherein the webpage provides a link which, when activated, functions to automatically add the product to a catalog belonging to the user.

6. The computer-readable media as recited in claim 1, wherein the webpage provides a link which, when activated, functions to create a poll posing a question about the product.

7. The computer-readable media as recited in claim 1, wherein the webpage provides a link which, when activated, functions to invoke a dialogue for creating a document that will stored within the data repository and that will be cross-referenced to the product and the user within the data repository.

8. The computer-readable media as recited in claim 7, wherein the document comprises a user review of the product.

9. The computer-readable media as recited in claim 7, wherein the document comprises a user comment about the product.

10. The computer-readable media as recited in claim 1, wherein the webpage comprises a product detail page.

11. A computer-readable media embodied in a non-transient, physical memory device having stored thereon computer-executable instructions for adding product information to a catalog of a user, the instructions performing steps comprising:
presenting to the user on a webpage during a process provided via an c-commerce website used to purchase the product a link which, when activated, functions to automatically add the product to the catalog of the user with the catalog being updated to include information related to the product and to be cross-referenced when stored in a data repository to both the product so added and the user.

* * * * *